(12) United States Patent
Van De Capelle et al.

(10) Patent No.: US 8,169,662 B2
(45) Date of Patent: May 1, 2012

(54) SYSTEM AND METHOD FOR REDUCING PRINT DELAYS FOR PRINT JOBS

(75) Inventors: Jean-Pierre R. N. Van De Capelle, Rochester, NY (US); Lee C Moore, Penfield, NY (US); Barry G Gombert, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 735 days.

(21) Appl. No.: 12/337,727

(22) Filed: Dec. 18, 2008

(65) Prior Publication Data

US 2010/0157351 A1    Jun. 24, 2010

(51) Int. Cl.
 *G06K 15/00* (2006.01)
(52) U.S. Cl. ........................................... 358/2.1
(58) Field of Classification Search ........................ None
See application file for complete search history.

(56) References Cited

U.S. PATENT DOCUMENTS

| | | | |
|---|---|---|---|
| 5,159,395 A | 10/1992 | Farrell et al. | |
| 5,347,353 A | 9/1994 | Fletcher | |
| 5,435,540 A | 7/1995 | Martin et al. | |
| 5,513,013 A | 4/1996 | Kuo | |
| 5,535,312 A | 7/1996 | Hammer et al. | |
| 5,596,389 A | 1/1997 | Dumas et al. | |
| 5,710,968 A * | 1/1998 | Clark et al. | 399/382 |
| 5,778,377 A * | 7/1998 | Marlin et al. | 1/1 |
| 6,469,810 B1 * | 10/2002 | Momonami et al. | 358/498 |
| 6,559,961 B1 * | 5/2003 | Isernia et al. | 358/1.14 |
| 2008/0170254 A1 * | 7/2008 | Shah | 358/1.15 |

OTHER PUBLICATIONS

P.F. Morgan, "Integration of Black Only and Color Printers", Xerox Disclosure Journal, vol. 16, No. 6, Nov./Dec. 1991.

* cited by examiner

*Primary Examiner* — Twyler Haskins
*Assistant Examiner* — Lennin Rodriguez (57) ABSTRACT

There is disclosed a printing system for processing an electronic document with an original stream having at least two printing related instructions. Responsive to reading the at least two printing related instructions with a controller; the original stream is split into two or more streams. A printer produces (1) one or more sets of prints from one or more of the two or more streams for storage in one or more inserters, and (2) a final set of prints from another one of the two or more streams, the final set of prints corresponding to a hardcopy stream with at least one gap. The one or more sets of prints are automatically stored in the one or more inserters and, pursuant to printing the final set of prints; the one or more inserters are used to insert at least one print from the one or more sets of prints into the at least one gap of the hardcopy stream.

21 Claims, 9 Drawing Sheets

SYSTEM AND METHOD FOR REDUCING PRINT DELAYS FOR PRINT JOBS

BACKGROUND AND SUMMARY

The disclosed embodiments relate generally to an improvement for a printing system (employing an interposer or inserter) and, more particularly, to a system and method for reducing print delays with respect to "mixed" print jobs.

The primary output product of a typical printing machine is a printed substrate, such as a sheet of paper bearing printed information in a specified format. Quite often, customer requirements necessitate that this output product be configured in various specialized arrangements or print sets ranging from stacks of collated loose printed sheets to tabulated and bound booklets. Even when using state of the art document producing and finishing apparatus, it may be necessary to insert sheets into the document which are produced by means other than the document producing apparatus, or produced at a separate time from the majority of the sheets contained in the print set. For example, it is not uncommon to place specially colored sheets, chapter dividers, photographs or other special insert sheets into a print set to produce a final document. Additionally, it is not uncommon to use preprinted sheets which were produced by four-color offset press techniques as special insert sheets in a document containing mostly text printed on ordinary white paper. In another example, booklets produced from signatures, often use special cover sheets or center sheets containing, for example, coupons. It is generally not desirable to pass these sheets through the printer processing apparatus because the ink on the special insert sheets tends to be smudged by the paper-handling rollers, etc. of the document producing apparatus. In addition, these special insert sheets may be of a particular weight stock or may include protruding tabs which may cause jams when transported through the printer processor. Different sheets of a single document may require different machine setup, e.g. fuser roll, fuser temperature, Xerographic settings, Xerographic inks etc, which require a certain time to change from one setting to another.

Accordingly, these special insert sheets must be inserted into the stream of sheets subsequent to processing in the printer processor section of the document producing apparatus. It is desirable to insert these sheets without disrupting the flow of the continuous stream of processed sheets. It is also desirable to insert these sheets in a manner which is transparent to the print processor or the finishing apparatus so that the operation of these apparatus need not be modified. A printing system with an interposer or inserter is disclosed in U.S. Pat. No. 5,596,389 to Dumas et al., the pertinent portions of which are incorporated herein by reference. Referring to column 1, line 51 through column 3, line 31 of U.S. Pat. No. 5,596,389, brief descriptions of disclosures relating to the area of inserting one or more insert sheets among a plurality of previously marked sheets are provided.

In various known printing systems, marking software is employed, in conjunction with one or more controllers, to implement a sheet scheduling technique. More particularly, in one known system each page of a job is programmed for printing and the corresponding marking related information is communicated to a print manager node. In turn, the print manager node generates a schedule indicating the sequence in which the sides of the job pages are to be printed. The functionality of some possibly applicable marking software is described in U.S. Pat. No. 5,535,312 to Hammer et al., the pertinent portions of which are incorporated herein by reference. As discussed in U.S. Pat. No. 5,535,312, with the marking software, the time at which each stored image is to be fed to a photoreceptor may be designated in a list or table, in advance of marking. As printing proceeds, the scheduling controller refers to the list or table for determining which image should be fetched from disk; and transmitted to the system memory for processing by one of the image generator processors. During the scheduling process a scheduling controller may generate gaps (defined by one or more unused pitches) between a set or a job. Moreover, pitches may be intentionally scheduled within the printing of a single set. For example, as discussed in U.S. Pat. No. 5,159,395, the pertinent portions of which are incorporated herein by reference, in one mode of operation a pitch is interleaved between two adjacent sheets on the photoreceptor to facilitate the finishing of multiple sets produced from a stored job.

Under certain circumstances, a job may include a varying attribute (e.g., where multiple media weights are employed). When this occurs, operational accommodations may be required for purposes of obtaining appropriate marking. For instance, when printing booklets with covers (where the print media associated with each cover is heavier than the print media associated with the other pages of the booklets), the temperature of the fuser may be greater for the cover than the other pages. Switching between print media to accommodate for change in fuser temperature can cause the print engine to skip pitches. This can dramatically reduce printing speed of the printing machine, and result in print delays.

There are numerous other scenarios in which a varying attribute for a print job (such as varying media weight, varying media size, varying media color, and varying plex) may be encountered. For instance, a job may require the marking of both monochrome and color prints. It is understood that printing one or more color prints in the middle of printing a predominately monochrome job can lead to print delays. An example in which color prints are interposed with monochrome prints is disclosed in a Xerox Disclosure Journal article to P. F. Morgan (vol. 16, No. 6, November/December 1991) entitled Integration of Black Only and Color Printers ("XDJ Article"). While the XDJ Article teaches that the preprinted color prints may be automatically inserted into a monochrome based hardcopy print stream, it is not believed that the XDJ Article discloses, teaches or suggests an approach for automatically processing a mixed color print job from an input end of a printing machine (e.g., digital front end) to an output end of the printing machine (e.g., post fuser output collection area).

In accordance with one aspect of disclosed embodiments there is disclosed a printing system for producing a print job. The printing system includes: A. a controller for receiving an electronic document represented by an original stream, the original stream including at least two printing related instructions, said controller (1) reading the at least two printing related instructions, and (2) responsive to said A(1), segregating the original stream into two or more streams; B. a printer for processing one or more of the two or more streams to produce one or more sets of prints; C. one or more inserters, the one or more sets of prints resulting from the printing of B being automatically stored in said one or more inserters; D. said printer, subsequent to said storing in C, printing another one of the two or more streams to produce a final set of prints corresponding with a hardcopy print stream having at least one gap, the at least one gap in the hardcopy print stream being disposed between a leading edge of one print and a lagging edge of another print; and E. pursuant to the printing of D, using said one or more inserters, in conjunction with said controller, to automatically insert at least one print of the one or more sets of prints into the at least one gap in the hardcopy print stream to produce the print job.

In accordance with another aspect of the disclosed embodiment there is disclosed a method of producing a print job in a printing system. The method includes A. receiving an electronic document represented by an original stream, the original stream including at least two printing related instructions; B. reading the at least two printing related instructions; C. responsive to said B, segregating at least part of the original stream into two or more streams; D. printing one or more of the two or more streams to produce one or more sets of prints; E. automatically storing the one or more sets of prints resulting from said D; F. printing another one of the two or more streams to produce a final set of prints; and G. pursuant to said F, automatically combining the one or more sets of prints with the final set of prints to produce the print job.

BRIEF DESCRIPTION OF THE DRAWINGS

The foregoing and other features of the embodiments described herein will be apparent and easily understood from a further reading of the specification, claims and by reference to the accompanying drawings in which:

DESCRIPTION OF DISCLOSED EMBODIMENTS

Figure 1:
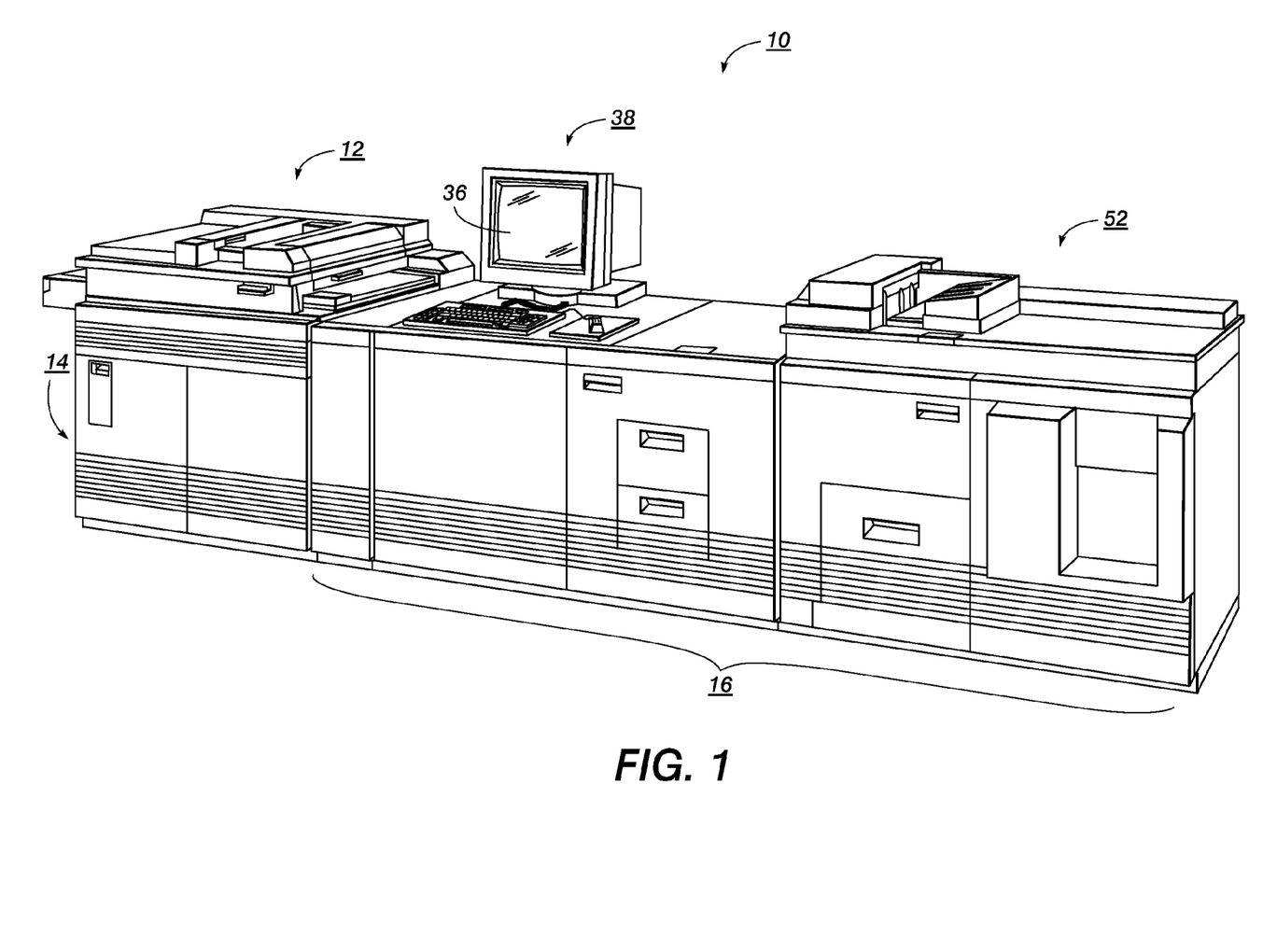
FIG. 1 is a perspective view depicting an electronic printing system.
Figure 2:
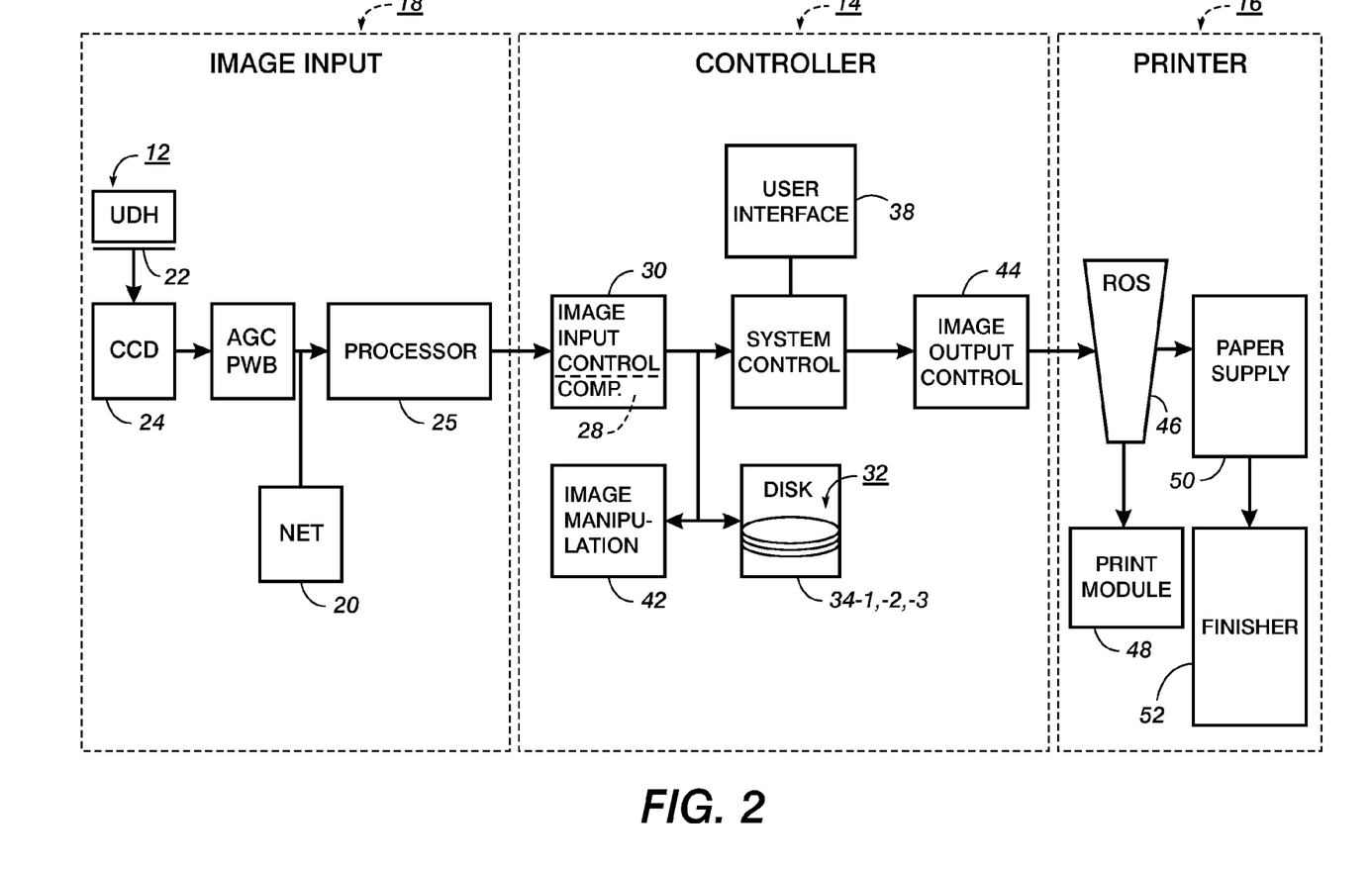
FIG. 2 is a block diagram depicting the major elements of the printing system shown in FIG. 1.

Referring to FIGS. 1 and 2, there is shown an exemplary laser based printing system (or imaging device) 10 for processing print jobs in accordance with the teachings of the disclosed embodiments. Printing system 10, for purposes of explanation, is divided into an image input section 12, controller section 14, and printer section 16. While a specific printing system is shown and described, the disclosed embodiments may be used with other types of printing systems such as ink jet, ionographic, etc. More particularly, the disclosed embodiment could be implemented with a 2, 3, 4 or multi-ink color printing system, such as the Xerox IGEN3® 110 Digital Production Press (as opposed to the monochrome printing system described below). In one example, the claimed invention might be particularly useful with a color printing system using an intermediate drum, such as the color printing system disclosed in U.S. Pat. No. 5,347,353 to Fletcher, the pertinent portions of which are incorporated herein by reference.

For off-site image input, image input section 18 (FIG. 2) has a network 20 with a suitable communication channel, such as an ethernet connection, enabling image data, in the form of image signals or pixels, from one or more remote sources, to be input to system 10 for processing. Other remote sources of image data, such as streaming tape, floppy disk, video camera, thumb drives, CDs, DVDs, memory cards etc. may be envisioned.

Figure 3:
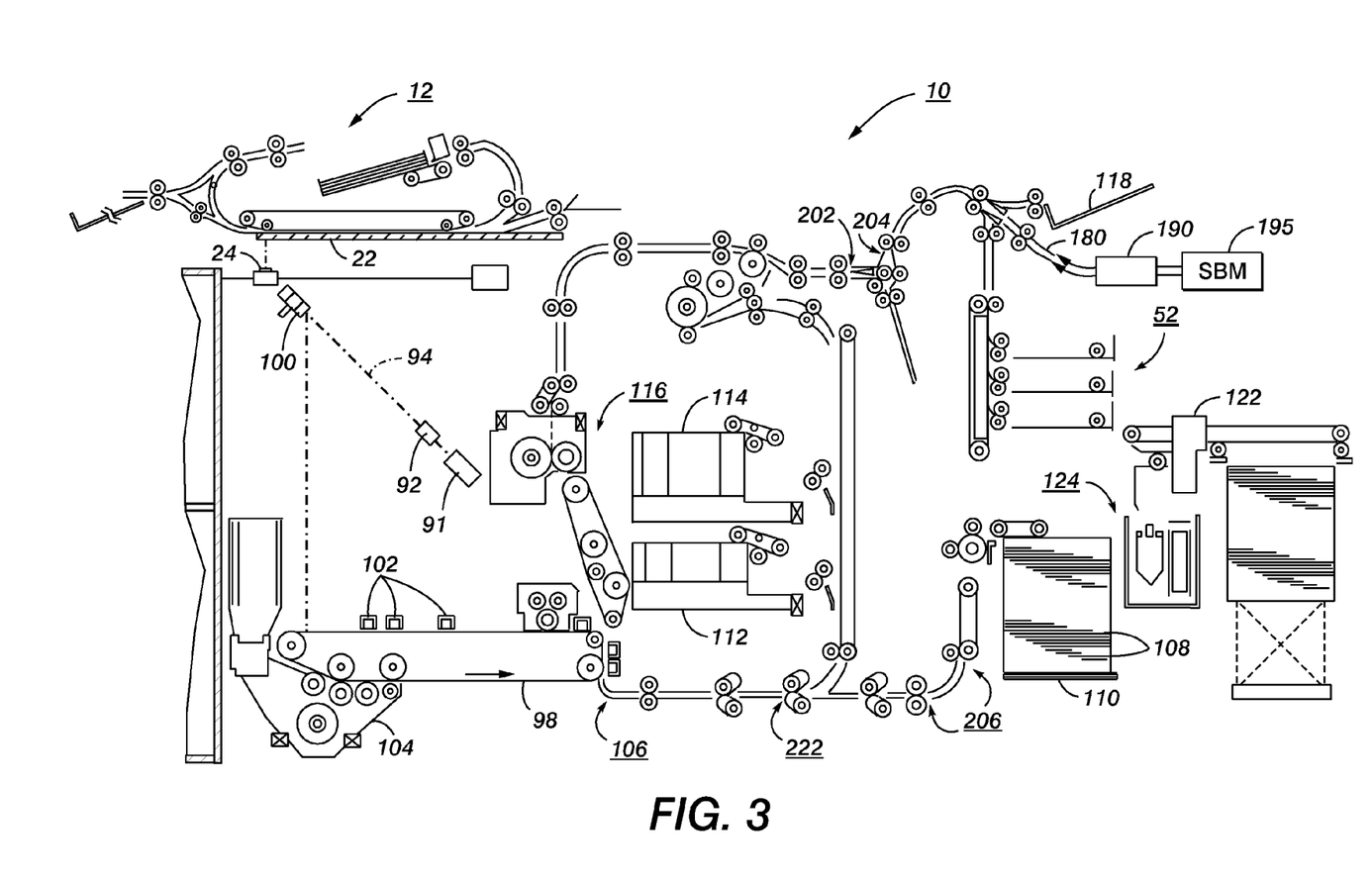
FIG. 3 is an elevational view illustrating the principal mechanical components of the printing system shown in FIG. 1.

Referring particularly to FIGS. 2 and 3, image input 18 incorporates a transparent platen 22 on which a document to be scanned may be positioned. One or more linear arrays (CCD) 24 are supported for reciprocating scanning movement below platen 22. Array 24 provides image signals or pixels representative of the image scanned which, after suitable processing by processor 25, are output to controller section 14. Processor 25 converts the analog image signals output by array 24 to digital image signals and processes the image signals as required to enable system 10 to store and handle the image data in the form required to carry out the job programmed. Processor 25 also provides enhancements and changes to the image signals such as filtering, thresholding, screening, cropping, reduction/enlarging, etc. It can for instance also accept input data from the network which can be processed depending on the type of data input.

The image data input from processor 25 is communicated to controller 14 and compressed by image compressor 28 of image input control 30. As the image data passes through compressor 28, it may be segmented into slices of N scanlines wide, each slice having a slice pointer. The compressed image data together with slice pointers and any related image descriptors providing image specific information (such as height and width of the document in pixels, the compression method used, pointers to the compressed-image data, and pointers to the image slice pointers) are placed in an image file. The image files, which represent different print jobs, are temporarily stored in system memory which may comprise a Random Access Memory or RAM pending transfer to main memory 32 where the data is held pending use. Main memory 32 has plural hard disks 34-1, 34-2, 34-3 for storing machine operating system software, machine operating data, and the image data currently being processed. When the compressed image data in mass memory 34 requires further processing, or is required for display on touchscreen 36 (FIG. 1) of UI 38, or is required by printer section 16, the data is accessed in mass memory 34 (FIG. 2). Where further processing other than that provided by processor 25 is required, the data is transferred to image manipulation section 42 where the additional processing steps such as collation, make ready, decomposition, etc. are carried out. Following processing, the data may be returned to main memory 34, sent to UI 38 for display on touchscreen 36, or sent to image output controller 44.

Referring now to FIGS. 2 and 3, printer 16 of this particular embodiment comprises a laser-type printer and, for purposes of explanation, is separated into a Raster Output Scanner (ROS) 46, Print Module 48, Paper Supply 50, and High Speed Finisher 52. ROS 46 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 48 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94.

The latent electrostatic images are developed by developer 104 and transferred at transfer station 106 to a print media 108 delivered by Paper Supply 50. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, to high speed finisher 52, or through bypass 180 to some other downstream finishing device, which could be a low speed finishing device such as a signature booklet maker (SBM) 195 (with sheet rotary 190) of the type manufactured by Bourg AB. High speed finisher 52 includes a stitcher 122 for stitching or stapling the prints together to form books and thermal binder 124 for adhesively binding the prints into books.

Figure 4:
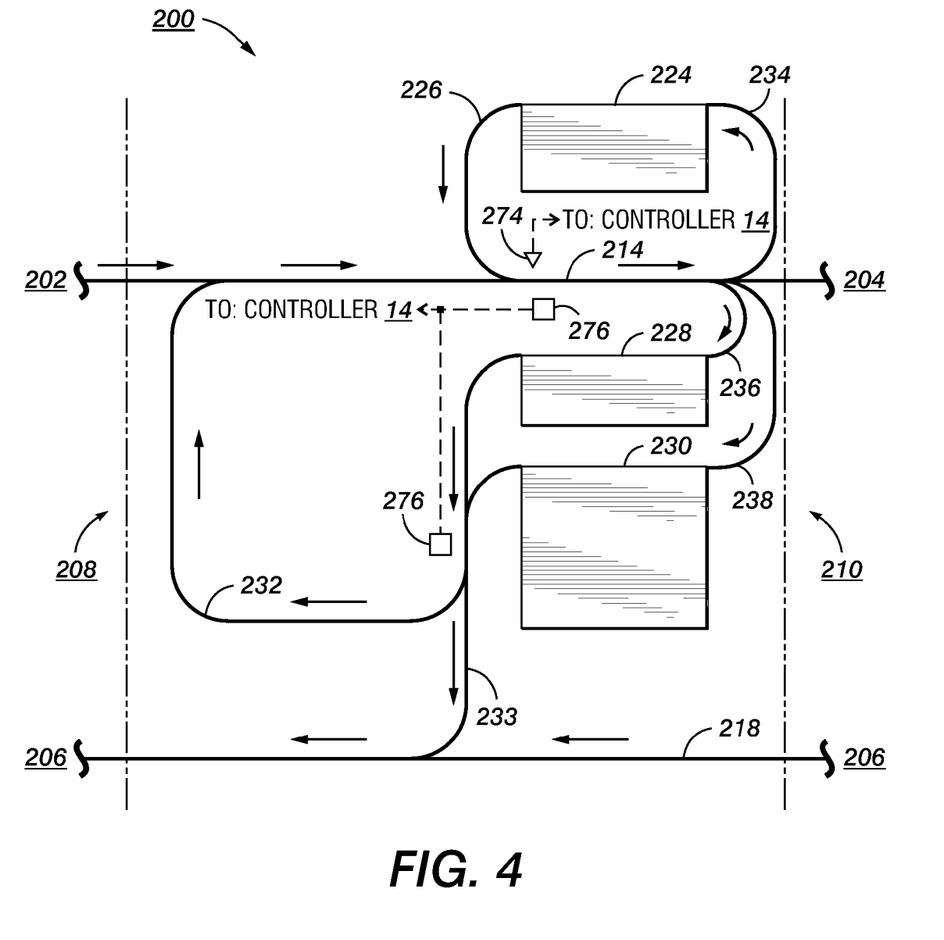
FIG. 4 is an elevational view schematically illustrating various mechanical components of an interposing module, the interposing module being operatively coupled with the printing system of FIG. 3.

Referring to FIG. 4, an interposing module (also referred to below as simply "interposer") is designated by the numeral 200. Reference is made to FIG. 3 for understanding the employment of the interposer in the printing system 10. In particular imaged substrate exit the print engine at output nip 202 and enter the finisher 52 by way of an inverting station 204. Additionally, sheets can be fed to the print engine from the high capacity feeder 110, by way of a pair of nips 206. Referring conjunctively to FIGS. 3 and 4, in one embodiment, a print engine side 208 of the interposer is operatively coupled with both the nip 202 and another one of the nips 206 while a finishing side 210 of the interposer is operatively coupled with both the inverting station 204 and one of the nips 206. Further details regarding the coupling of the interposer 200 with the print engine and the finisher will appear below.

Referring still to FIGS. 3 and 4, the interposer 200 includes a first sheet transport path 214 and second sheet transport path 218. The first sheet transport path 214 communicates with the exit of the print engine and the entrance of the finisher while the second sheet transport path 218 communicates with the high capacity feeder 110 and a sheet feed path 222 of the print engine. In one example, a first sheet tray 224 communicates with the first sheet transport path 214, by way of a first feed path 226, while each of a second sheet tray 228 and a third sheet tray 230 communicate with the first sheet transport path 214 by way of a second feed path 232. Additionally, each of the sheet trays 228, 230 communicate with the second sheet transport path 218 by way of a third feed path 233. In another embodiment, sheet trays 228, 230 are combined structurally to provide high capacity sheet feeding function. Paths permitting prints to be automatically fed to trays 224, 228 and 230 are designated by the numerals 234, 236 and 238. Prints may be delivered to the trays 224, 228 and 230 from the imaging device 10 (FIG. 3) in accordance with instructions programmed provided in a job schedule, the details of which scheduling will appear from the description below.

As should be appreciated, the interposer is a flexible module which provides a variety of operational modes, each of which modes can, in one example, be controlled by the controller 14 (in conjunction with a sensing arrangement [not shown]). As will be understood by those skilled in the art, the interposer of FIG. 4 is either under the control of controller 14, or the control of a dedicated interposer controller (not shown). Various control schema for interposers are described in the above-cited patents. Moreover, it follows that various subsystems of the interposer might depend on control and/or sensing related components that are not shown in FIG. 4. However, teachings regarding such components are readily available to those skilled in the art. For instance U.S. Pat. No. 5,435,540 to Martin et al., the pertinent portions of which are incorporated herein by reference, illustrates the use of misfeed sensors around a print media tray. Additionally, U.S. Pat. No. 5,513,013 to Kuo, the pertinent portions of which are incorporated herein by reference, illustrates the use of a bar code reader to detect bar coded sheets (such as bar coded covers) in a paper tray.

Referring to two modes of operation for the interposer, in a first mode of operation, the interposer serves as a supplementary feeder for the print engine. More particularly, through use of the third feed path 233 and the second sheet transport path 218 sheets are fed to the print engine from either of sheet trays 228, 230. In a second mode of operation, sheets are added to a stream of imaged substrates exiting the print engine at nip 202. For many cases, operation in the second mode will include adding a "special" sheet, e.g. cover, separator, preprinted or drilled sheet, to the stream of imaged substrates. In one submode of the second mode of operation a special sheet is interposed between a leading imaged substrate and a trailing imaged substrate of the same job. In an implementation of the one submode, control signals are scheduled in such a way that a leading imaged substrate, a special insertion sheet and a trailing imaged substrate are scheduled respectively to be fed in a first pitch, a second pitch and a third pitch. In this way a gap is created in a hardcopy print stream for receiving the special insertion sheet.

Figure 5:
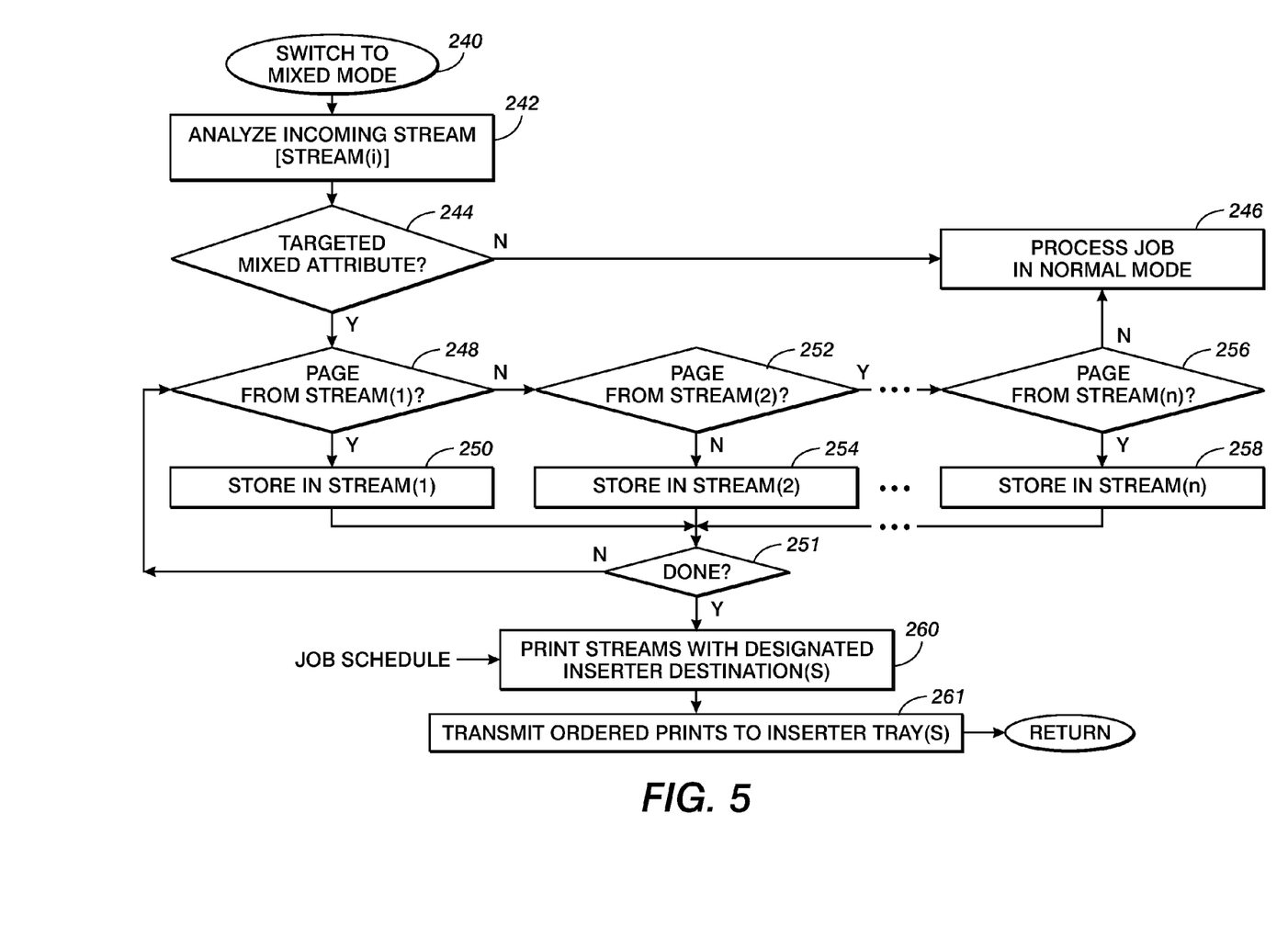
FIG. 5 is a flow chart illustrating an approach for processing a "mixed" print job in anticipation of printing the same.

Referring now to FIGS. 2 and 5, a printing system for managing "mixed" print jobs is described in further detail. As used herein, a mixed print job refers to any electronic document in which a targeted attribute type (e.g., media type, color type, or flex type) varies across the document. At 240, a printing system user may select a mixed job button (not shown) on UI 38 so that the system control (of controller 14) can (at 242) assess or analyze an incoming stream ("stream (i)" corresponding with the electronic document) to determine if variability exists for one of several targeted attribute types. Based on a query of 244, a given print job may be processed in a normal mode (246) if variability does not exist for any one of the targeted attributes. In normal mode printing the type of stream segregation described below need not be executed.

Referring still to FIGS. 2 and 5, if a varying targeted attribute exists in an incoming stream, then each page of the incoming stream is examined with controller 14 to determine if it belongs to one of two or more streams. In particular, if the page being examined belongs to stream(1) [248] then that page is stored in memory (e.g., memory 32) [250] with other stream(1) pages and any references for other stream(i) pages. The process then loops back to 248 unless the incoming stream has been completely examined (via a test at 251). If the page being examined belongs to stream(2) [252] then that page is stored in memory (e.g., memory 32) [254] with other stream(2) pages. Additionally, as shown in 254, a reference to the stream(2) page currently being stored is added to stream (1) [the "master stream"]. The process then loops back to 248 unless the incoming stream has been completely examined (via the test at 251). As illustrated by 256 and 258, the process of FIG. 5 may be performed for up to n stream types. As will appear from the description below, stream(1) serves as a master stream, associating image data, printing instructions and/or references for each page of the print job.

Figure 6:
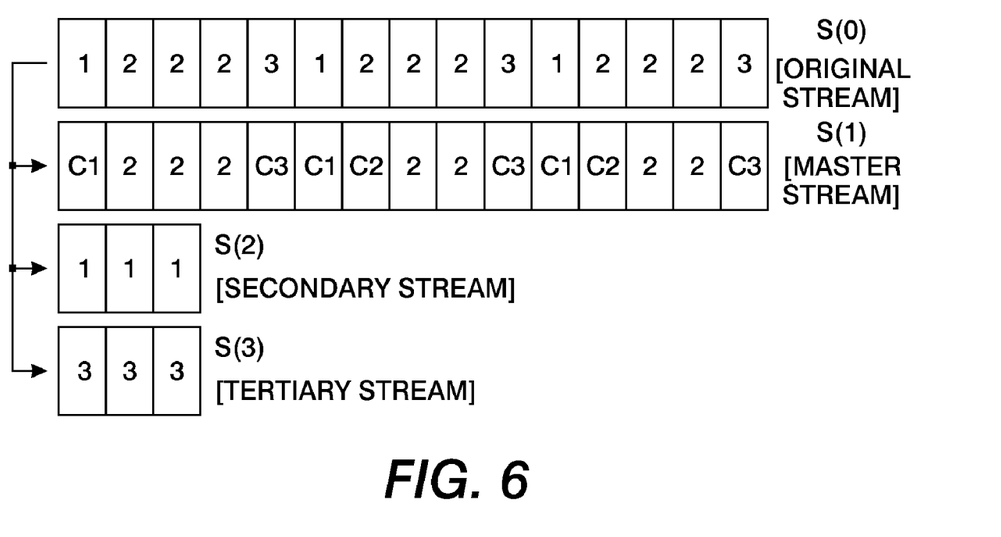
FIG. 6 is a schematic block diagram illustrating how one or more print streams are processed in accordance with one aspect of the disclosed embodiments.

Referring specifically to the example of FIG. 6, an example of one stream splitting process contemplated by FIG. 5 is described in further detail. In the example of FIG. 6, an incoming original stream S(0) (written, for instance, in POSTSCRIPT® and corresponding with an exemplary print job) includes 15 pages with every five pages representing a pamphlet. The numbers "1," "2," and "3" correspond with, among other things, an instruction for a given attribute type (such as media weight). In the example, "1" corresponds with a page including an instruction to use a first media weight (possibly for a cover), "2" corresponds with a page including an instruction to use a second media weight (corresponding with a weight that is possibly lighter than the first media weight), and "3" corresponds with a page including an instruction to use a third media weight (possibly for a back page corresponding with a weight that is possibly lighter than the first media weight, but slightly heavier than the second media weight).

Figure 7:
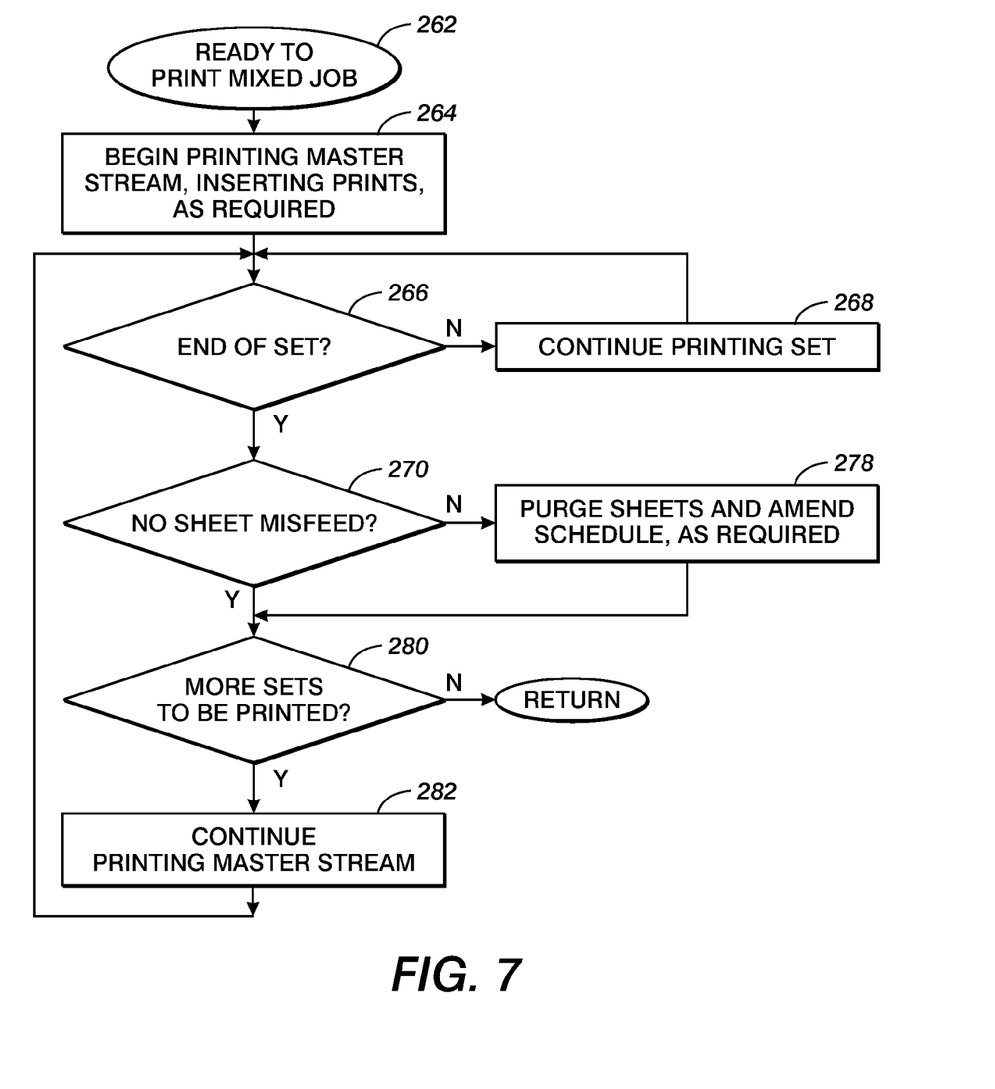
FIG. 7 is a flow chart illustrating an approach for printing the mixed print job processed in FIG. 5.

As should be recognized, media weight requirements for a given job can vary widely, and more than three media weights could be employed in the process of FIGS. 5 and 7 without altering the mixed print job processing technique disclosed herein. For instance, the job of FIG. 6 might have called for tab stock, in which case certain pages (each of which would include a call for tab stock weight) might have been interspersed with the job. Additionally, while the example of FIG. 6 relates to variation in media weight, the underlying process would be just as applicable for jobs varying in plex or color.

In operation, each one of the 1st, 6th, and 11$^{th}$ pages is referenced in a master stream [S(1)] as "C1" and the image data/printing instructions corresponding with each page is associated with a secondary stream [S(2)]. A similar approach is taken for the 5$^{th}$, 10$^{th}$ and 15$^{th}$ pages, except that each one of these pages is referenced as "C3" and the corresponding image data/printing instructions for each page is associated with a tertiary stream [S(3)]. The image data/printing instructions for each one of the pages designated as 2 is associated with the master stream [S(1)] in anticipation of use in the printing technique described immediately below.

Referring to FIGS. 4 and 5, prior to printing S(1) a job schedule may be developed for the exemplary print job—as indicated above, the job schedule can be developed in accordance with the teachings of U.S. Pat. No. 5,535,312. In the example of FIG. 5, the schedule would dictate that each one of S(2) and S(3) be printed prior to S(1) and transmitted automatically to separate inserter trays. Accordingly, the covers 1 and the back pages 3 can be printed (per 260) and transmitted to two of trays 224, 228 and 230 (per 261) so that the covers are loaded in one tray and the back pages are loaded in another tray.

Referring now to FIGS. 2 and 7 (in conjunction with the example of FIG. 6), an approach for printing the exemplary mixed print job processed with the technique of FIG. 5 is described. When the mixed print job is ready for printing (262), the master stream [S(1)] is fetched from memory 32 and sent to the printer 16 for marking (264). As S(1) is marked an imaged page is created for each of electronic pages 2, and a skipped pitch or gap is created for each one or electronic pages 1 and 3. Consequently, a hardcopy print stream, including hardcopy prints and gaps, is delivered to the first sheet transport path 214. By reference to the schedule for the exemplary print job (see 260), and through use of the controller 14 (or a dedicated controller for the interposer communicating with controller 14), imaged prints (corresponding with imaged covers 1 and imaged back pages 3) are fed from two of the sheet trays 224, 228 and 230 to at appropriate times to fill the gaps in the hardcopy stream in a manner dictated by the schedule. As the hardcopy stream passes through the interposer an end-of-set condition is checked (at 266) to determine if a given print set has passed through the interposer. This could be done by counting page throughput or, alternatively, by reading machine readable code (e.g., bar code) marked on selected prints. Printing of each set continues (268) until the end-of-set condition is met.

Figure 8:
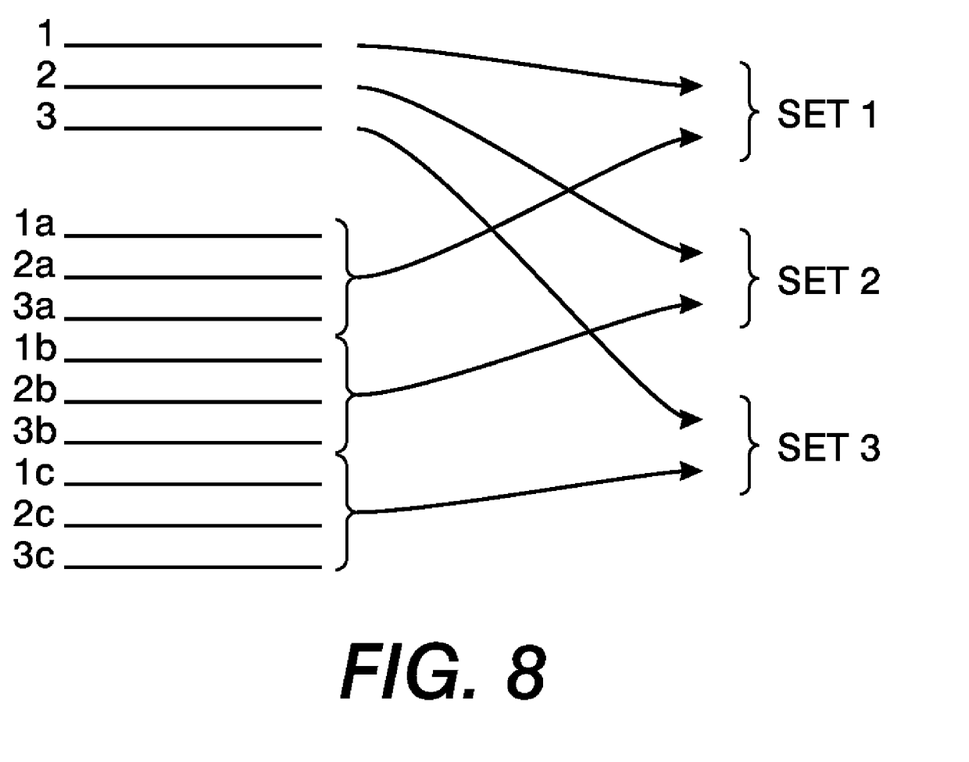
FIG. 8 is a schematic plan view illustrating how three sets of an exemplary print job may be printed in accordance with the disclosed embodiments.

Responsive to the system determining that an end-of-set condition should have been met, a misfeed test may be performed at 270. Referring to FIGS. 4 and 8, exemplary implementations for performing such test follow. FIG. 8 schematically illustrates a process for use with the interposer which three covers (designated as 1, 2 and 3) are inserted into three print sets (1a-3a, 1b-3b, and 1c-3c). Initially, cover 1 is supposed to be inserted in front of print 1a and, after 3a passes a sensor 274, the controller determines whether four prints (one complete set) have passed by sensor 274. Alternatively, each of one of covers 1, 2 and 3 can be provided with machine readable code so that the exit of each cover from one of the inserter trays 224, 228 and 230 can be read by a suitable reader 276 in the sheet transport path 214).

Referring again to FIG. 7, if a misfeed is detected at 270, then appropriate steps are taken (possibly by a system operator) to cure any misfeed (278) and purge the current set. As should be appreciated, the job schedule may require amendment to accommodate for loss of sheets during purging. For instance, referring again to the example of FIG. 6, if a cover 1 was misfed, it might be necessary to purge the remaining part of an associated set (including three of pages 2 and one of back page 3). In this event, it might be desirable to amend the job schedule to print another set (including a cover 1, three of pages 2 and a back page 3). After printing each set, an end-of-job condition is checked at 280 and printing continues (282) unless either all of the sets have been printed or all of the prints in the inserter trays have been fed to first sheet transport path 214.

Figure 9:
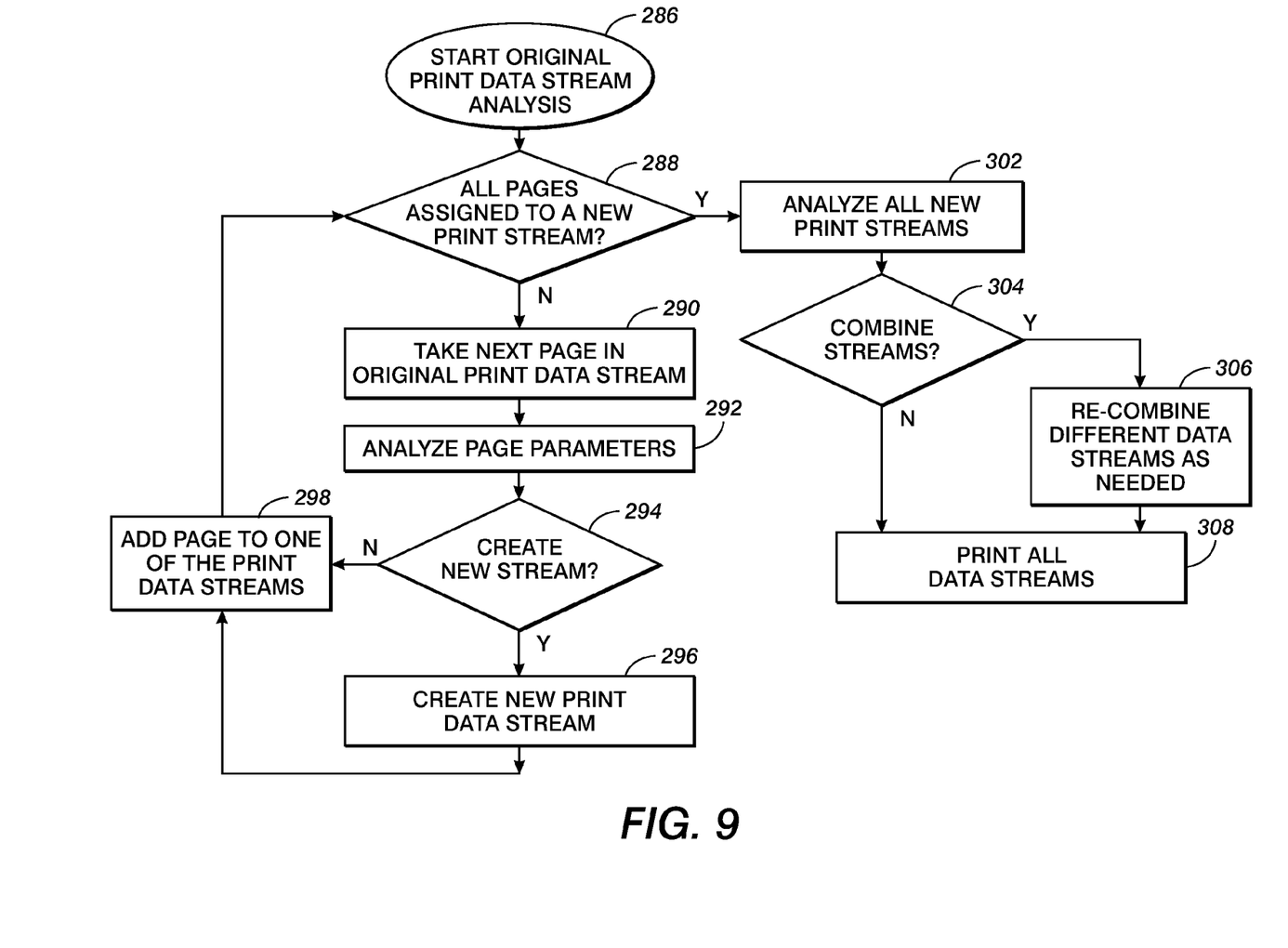
FIG. 9 is a flow chart illustrating another approach for processing the mixed print job in anticipation of printing the same, the flow chart of FIG. 9 including an approach for combining streams, when needed.

Referring now to FIG. 9, another embodiment of the printing system for managing mixed print jobs is described. Initially, a print data stream may be analyzed, page by page, for printing parameters (286, 288, 290, 292), such as paper weight, size, inks used on the paper, plex, which require some time to switch the engine parameters from one state to another. When a new set of relevant parameters is encountered, a decision is made to create a new print stream (294, 296). A current page may be added to an appropriate print stream (298) for a particular set of printing parameters. When all pages of the original print data stream are assigned to a new print stream at 288, the newly created print data streams are analyzed in 302.

Referring still to FIG. 9, at 304, a decision is made regarding whether some of the newly created print streams should be combined. In one example, this decision can be based on whether there are too many new streams created (e.g., too many changes in the printing parameters of the original print data stream as compared to available interposers or inserter trays). In another example print streams can be combined because the time when they are needed to print the final stream is always alternating, and therefore the print streams can be stored in the same inserter/interposer. At 306, the new data streams may be recombined until one or several boundary conditions is met. The boundary conditions may include, among other things: (1) number of interposer trays equals the number of distinct print sets to be stored in the interposer trays, or (2) the final print stream can be produced in a final print run by pulling the appropriate sheets from the interposer tray. Recombination of print streams may also be based on changes in printing parameters which result in less time for job execution. Alternatively, streams may be recombined to minimize total printing time—comparing total printing times for different ways of printing the final data stream. In the event an operator is required to physically change parts of the machine or the machine setup, appropriate information would be provided by the user interface 39 (FIG. 2).

Referring to FIGS. 2-4 and 9, in 308 all data streams (namely m streams) are printed. The first m-1 print streams are directed towards trays in the interposer(s). Pursuant to final printing of the mixed print, the final data stream is printed in such a way that the appropriate sheets are pulled out of the appropriate interposer trays and inserted into the final printing stream in the correct places. This requires inserting an appropriate number of blank pitches in order to leave space for the sheets out of the interposer(s) to be inserted between pages of the final print stream.

Based on the above description, the following aspects of the disclosed embodiments should now be apparent:

The system and method disclosed herein may be extended to include multiple printing streams, using multiple inserters or multiple trays of a single inserter. Each of the printing streams can require different machine settings which require a certain time to setup. In one aspect of this disclosure the generation of the different print streams is automated by a controller and the operator is guided to manipulate the machine and or the printed output as required in order to produce the final mixed output document.

In one aspect of the disclosed embodiments the fuser can be replaced or adjusted to work with a plurality of media sizes and different media sizes can be used within one document. In yet another aspect of the disclosed embodiments media size and heat level can vary simultaneously, and in one example the printing system can be changed between different printing modes using a different set of printing inks and different parts of a document can be printed using different inks.

In another aspect of the disclosed embodiments there are multiple sets of prints, corresponding to multiple media and machine settings, which may require a certain time to switch and which can be more efficiently or more rapidly produced by printing each of the multiple sets in a separate print run and producing the final document by pulling the correct sheets from the correct interposers and interposer trays. As contemplated, the analysis of the print stream and the optimal print production method is derived automatically by the controller.

Based on the above description, the following aspects of the claimed invention should also now be apparent:

There is disclosed a printing system for processing an electronic document with an original stream having at least two printing related instructions. Responsive to reading the at least two printing related instructions with a controller; the original stream is split into two or more streams. A printer produces (1) one or more sets of prints from one or more of the two or more streams for storage in one or more inserters, and (2) a final set of prints from another one of the two or more streams, the final set of prints corresponding to a hardcopy stream with at least one gap. The one or more sets of prints are stored in the one or more inserters and, pursuant to printing the final set of prints; the one or more inserters are used to insert at least one print from the one or more sets of prints into the at least one gap of the hardcopy stream.

The at least two printing related instructions may include a first instruction and a second instruction. The first instruction may be used to instruct the printing system to produce the one or more sets of prints with one media type and the second instruction may be used to instruct the printing system to produce the final set of prints with another media type. In one example, the one media type corresponds with one media weight and the other media type corresponds with another media weight. As contemplated, the printing system includes a fuser settable at one of a plurality of heat levels, wherein the fuser is settable at (1) one of the plurality of heat levels pursuant to printing the one or more sets of prints, and (2) another one of the plurality of heat levels pursuant to printing the final set of prints. In another example, one media type corresponds with one media size and the other media type corresponds with another media size.

The printing system may include a xerographic subsystem settable at one of a plurality of operational levels, wherein the xerographic subsystem may be set at (1) one of the plurality of operational levels pursuant to printing the one or more sets of prints, and (2) another one of the plurality of operational levels pursuant to printing the final set of prints.

In one of the disclosed embodiments, the other one of the two or more streams is configured with one or more references, and the one or more references (which may be part of a schedule) are used to cause the one or more inserters to automatically insert the at least one print of the one or more sets of prints into the at least one gap in the hardcopy stream to produce the print job. In another one of the disclosed embodiments, each print in the one or more sets of prints is produced with two or more color toners and each one of the prints in the final set of prints is produced with one or more toners. In yet another one of the disclosed embodiments, each print in the one or more sets of prints is produced in duplex and each one of the prints in the final set of prints is produced in simplex.

As further contemplated, the one or more sets of prints may include at least two print sets, and the one or more inserter trays may include at least two inserter trays. In one example, one of the at least two print sets is stored in one of the at least two inserter trays and another one of the at least two prints is stored in another one of the at least two inserter trays. Pursuant to the above-described printing, the at least two inserters may be used to automatically insert prints of both the at least two print sets into gaps of the hardcopy stream to produce the print job During the combining of the one or more sets of prints and the final set of prints a misfeed may occur. The printing system may be configured to detect such misfeed, and, responsive to such detection, any necessary purging of one or more prints (or sheets) may be effected by a printing system operator.

The original stream may be segregated into at least three streams and, when a selected condition occurs, two or more of the at least three streams may be combined into a single stream. In one example, the one or more set of prints corresponds with a first number and the one or more inserters may correspond with a second number. In this one example, the selected condition occurs when the first number is greater than the second number.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A printing system for producing a print job, comprising:
   a controller for receiving an electronic document represented by an original stream, the original stream including printing related instructions, said controller reading the printing related instructions, and responsive thereto, segregating the original stream into segregated streams;
   a printer for processing the segregated streams to produce corresponding sets of prints; and
   one or more inserters to store a number of the corresponding sets of prints, the number of stored corresponding sets of prints being less than a number of segregated streams;
   said controller combining, prior to processing, two of the segregated streams into a single stream when a number of inserters is less than a number of segregated streams minus one;
   said printer, subsequent to storing the number of corresponding sets of prints, printing the remaining segregated streams to produce a final set of prints corresponding with a hardcopy print stream, the hardcopy print stream having a gap, the gap in the hardcopy print stream being disposed between a leading edge of one print and a lagging edge of another print;
   said controller controlling said inserters to automatically insert one of the stored prints into the hardcopy stream at the gap within the hardcopy stream to produce the print job.

2. The printing system of claim 1, in which the printing related instructions include a first instruction and a second instruction, wherein the first instruction instructs the printing system to produce a first set of prints with one media type and the second instruction instructs the printing system to produce the final set of prints with another media type.

3. The printing system of claim 2, wherein the one media type corresponds with one media weight and the other media type corresponds with another media weight.

4. The printing system of claim 3, further comprising a fuser settable at one of a plurality of heat levels, wherein said fuser is settable at one of the plurality of heat levels pursuant to printing one set of prints, and at another one of the plurality of heat levels pursuant to printing the final set of prints.

5. The printing system of claim 2, wherein the one media type corresponds with one media size and the other media type corresponds with another media size.

6. The printing system of claim 1, further comprising a xerographic subsystem settable at one of a plurality of operational levels, wherein said xerographic subsystem is set at one of the plurality of operational levels pursuant to printing one set of prints, and at another one of the plurality of operational levels pursuant to printing the final set of prints.

7. The printing system of claim 1, wherein one of the segregated streams is configured with a reference, and wherein the reference is used to cause said inserters to automatically insert a print into the gap in the hardcopy print stream to produce the print job.

8. The printing system of claim 1, wherein each print in the sets of prints is produced with two or more color toners and each print in the final set of prints is produced with one or more color toners.

9. The printing system of claim 1, wherein each prints in the sets of prints is produced in duplex and each print in the final set of prints is produced in simplex.

10. The printing system of claim 1, wherein a misfeed from one of said inserters is detected and, responsive to detecting said misfeed, a print from the sets of prints or the final set of prints is purged.

11. A method of producing a print job in a printing system, comprising:
    receiving, by a controller, an electronic document represented by an original stream, the original stream including printing related instructions;
    reading, by the controller the printing related instructions, and responsive thereto, segregating the original stream into segregated streams;
    processing, by a printer, the segregated streams to produce corresponding sets of prints;
    storing, at one or more inserters, a number of the corresponding sets of prints, the number of stored corresponding sets of prints being less than a number of segregated streams;
    combining, by the controller, prior to processing, two of the segregated streams into a single stream when a number of inserters is less than a number of segregated streams minus one;
    printing, by the printer, subsequent to storing the number of corresponding sets of prints, the remaining segregated streams to produce a final set of prints corresponding with a hardcopy print stream, the hardcopy print stream having a gap, the gap in the hardcopy print stream being disposed between a leading edge of one print and a lagging edge of another print; and
    controlling, by the controller, the inserters to automatically insert one of the stored prints into the hardcopy stream at the gap within the hardcopy stream to produce the print job.

12. The method of claim 11, in which the printing related instructions include a first instruction and a second instruction, wherein the first instruction instructs the printing system to produce the sets of prints with one media type and the second instruction instructs the printing system to produce the final set of prints with another media type.

13. The method of claim 12, wherein the one media type corresponds with one media weight and the other media type corresponds with another media weight.

14. The method of claim 13, in which the printing system includes a fuser with the fuser being settable at one of a plurality of heat levels, wherein the fuser is to one of the plurality of heat levels, and wherein the fuser is to another of the plurality of heat levels.

15. The method of claim 12, wherein the one media type corresponds with one media size and the other media type corresponds with another media size.

16. The method of claim 11, in which the printing system includes a xerographic subsystem settable at one of a plurality of operational levels, wherein the xerographic subsystem is set to one of the plurality of operational levels, and wherein the xerographic subsystem is set to another of the plurality of operational levels.

17. The method of claim 11, wherein one of the streams is configured with a reference, the reference being used to realize automatic combining.

18. The method of claim 17, in which the printing system includes a marking system, and in which, the final set of prints is outputted from the marking system as a hardcopy print stream with a plurality of gaps, wherein the controller uses a schedule to insert a sets of prints into the plurality of gaps of the hardcopy print stream.

19. The method of claim 11, in which the printing related instructions include a first instruction and a second instruction, wherein the first instruction instructs the printing system to produce each print of the sets of prints with at least two color toners and the second instruction instructs the printing system to produce the final set of prints with at least one color toner.

20. The method of claim 11, in which the printing related instructions include a first instruction and a second instruction, wherein the first instruction instructs the printing system to produce the sets of prints in duplex and the second instruction instructs the printing system to produce the final set of prints in simplex.

21. The method of claim 11, further comprising:

detecting when a misfeed of media occurs; and purging a of the sets of prints or the final set of prints when the misfeed is detected.

* * * * *